United States Patent [19]

Spencer

[11] Patent Number: 4,589,889
[45] Date of Patent: May 20, 1986

[54] METHOD AND APPARATUS FOR THE REMOVAL OF NOXIOUS ACIDIC GASES FROM A HOT EXHAUST GAS STREAM

[76] Inventor: Peter Spencer, 9 Links Close, Ashstead, Surrey, England

[21] Appl. No.: 739,625

[22] Filed: May 31, 1985

Related U.S. Application Data

[63] Continuation of Ser. No. 595,262, Mar. 30, 1984, abandoned.

[30] Foreign Application Priority Data

Mar. 31, 1983 [GB] United Kingdom ............... 8308952

[51] Int. Cl.$^4$ ............................................. B01D 53/14
[52] U.S. Cl. .......................................... 55/48; 55/51; 55/73; 55/89; 55/229; 55/94
[58] Field of Search .................. 55/46, 48, 51, 68, 73, 55/94, 89, 223, 229

[56] References Cited

U.S. PATENT DOCUMENTS

| | | | |
|---|---|---|---|
| 3,370,402 | 2/1968 | Nakai et al. .......................... 55/94 |
| 3,492,788 | 2/1970 | Hochgesand et al. ................ 55/48 |
| 3,511,027 | 5/1970 | Roberts et al. ..................... 55/73 X |
| 3,824,766 | 7/1974 | Valentine et al. ..................... 55/48 |
| 3,847,570 | 11/1974 | Gunther ............................... 55/73 |
| 4,302,220 | 11/1981 | Volkamer et al. .................. 55/48 X |

Primary Examiner—Charles Hart
Attorney, Agent, or Firm—Price, Heneveld, Huizenga & Cooper

[57] ABSTRACT

A method and apparatus for removing noxious oxides of sulphur and nitrogen from a hot exhaust gas produced by burning fossil fuels and simultaneously producing a hot water stream essentially free of noxious acidic gases, suitable for district heating. The hot exhaust gas stream is fed to an absorber where it is counter currently contacted with a recirculation water stream, an inlet water stream and an alkali stream to cool the hot exhaust gas then absorb the noxious oxides. A first water line containing absorbed oxides leads from a catch try beneath the absorber middle section to a sub-atmospheric pressure stripper and a second water line leads hot recirculation water from the absorber bottom to a flash pan in the stripper. Due to the reduced pressure in the stripper the absorbed oxides are removed from the water and heat is transferred from the absorber to the stripper. All the heat energy required to operate the stripper is supplied to the system by the hot gases.

6 Claims, 1 Drawing Figure

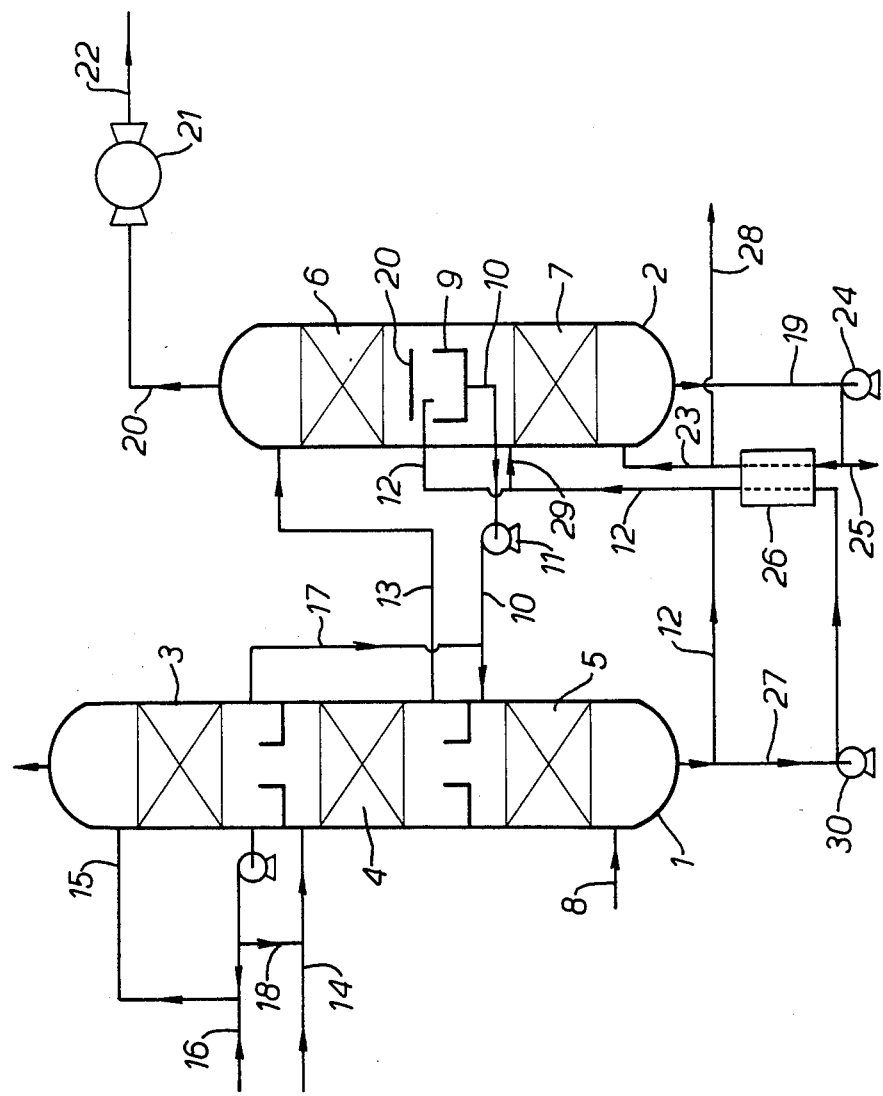

METHOD AND APPARATUS FOR THE REMOVAL OF NOXIOUS ACIDIC GASES FROM A HOT EXHAUST GAS STREAM

This is a continuation of application Ser. No. 595,262, filed Mar. 30, 1984 and now abandoned.

The present invention relates to a method and apparatus for the removal of noxious acidic gases, in particular sulphur dioxide ($SO_2$) and possibly oxides of nitrogen ($NO_x$) from exhaust gases resulting from the combustion of coal or oil fossil fuels containing sulphurous compounds, before being discharged into the atmosphere.

Several processes have been developed and applied to remove $SO_2$ from the combusted gases discharged from power stations, and other industrial processes, with many using absorption techniques assisted by various chemicals in water solutions. Most require substantial quantities of heat supplied externally to the process or chemicals or a combination of both, as well as extensive heat exchange surfaces.

It is well known that sulphur dioxide is partially soluble in water and that its solubility may be improved by the presence of certain commonly available chemicals. It is further well known that the solubility of sulphur dioxide in water increases as the water temperature drops, and that dissolved sulphur dioxide may be readily stripped out of solution with the aid of a hot carrier gas or by boiling.

It is also well known that combusted gases containing sulphur compounds not only will contain sulphur dioxide, but small quantities of sulphur trioxide which forms very corrosive solutions of sulphuric acid in the presence of water.

It is an object of the present invention, given these known facts, to recover a substantial proportion of the heat energy contained in an exhaust gas stream and to use this heat to effect the removal and reconcentration of noxious acidic gases such as sulphur dioxide as well as $NO_x$ from the stream, without extensive use of heat exchangers. It is a further object to minimise the consumption of chemicals used in the process.

According to one aspect of the invention, there is provided a method of removing noxious acidic gases from and cooling a hot exhaust gas stream characterised in that it comprises applying separately relatively cool supply water and a recirculating water stream to the hot exhaust gas stream in a first vessel; transferring heat from the exhaust gas stream to the recirculating water stream to cool the gas stream; absorbing a proportion of the noxious gases in the supply water stream; transferring the supply water and its absorbed gases and the heated recirculating water as first and second water streams to a second vessel operating at a pressure below that of the first vessel; allowing the absorbed gases to leave the water as a result of the temperature of the water, the reduced pressure and the heat transferred to the second vessel by the heated recirculating water; reintroducing the recirculating water to the first vessel; and removing the supply water and noxious gases from the second vessel in separate streams.

In the most preferred embodiment, the supply water is also cooled but to a lesser extent than the recirculating water and in that the recirculating water also absorbs some noxious gases but to a lesser extent than the supply water stream.

Thus, it is possible to operate the process using the heat of the gas stream as the only heat input to the process. This represents a considerable saving in energy and operating costs.

Any $SO_2$ removed may subsequently be concentrated and used elsewhere while the stream consisting essentially of $SO_2$ free hot water may be used for district heating or supplying low grade heat.

The process is applicable where the gases to be processed are received at a temperature above 100° C., preferably substantially higher, so that there is sufficient extractable heat to strip out effectively all dissolved sulphur dioxide from the hot water stream leaving the process. Within practical limits, the higher the inlet gases temperature, the greater the potential removal of sulphur dioxide and effective utilisation of chemicals consumed.

Preferably, an alkali is applied to the first vessel in order to react with any noxious gases which are not absorbed by the water. The alkali may also serve as a corrosion inhibitor. Thus, the quantity of the process chemicals consumed may be reduced to that necessary to remove the last traces of noxious gases in the clean gas outlet stream, to control corrosion, and suitably treat the hot water stream leaving the process whilst exploiting such chemicals potential to aid the solution of sulphur dioxide in a water solution.

In a preferred embodiment, the second water stream including some absorbed noxious gases is taken from the first vessel at an elevated temperature and fed to a flash zone in the second vessel where some of the water is flashed off together with some absorbed gases and the second water stream is recycled at a reduced temperature to the first vessel where it cools the exhaust gas stream and absorbs noxious gases by direct contact before the exhaust gas is contacted by the supply water stream. The flashed off water may be used to supply heat to the first water stream in the second vessel to aid in stripping the noxious gases from the first water stream.

According to a second aspect of the invention there is provided apparatus for removing noxious acidic gases from a hot exhaust gas stream characterised in that it comprises an absorber and a stripper, a gas inlet to the absorber, a supply water inlet to the absorber, a first line for leading the supply water, which contains absorbed noxious gases from the absorber to the stripper, a water recycle from the stripper to the absorber, a second line for leading the heated water recycle from the absorber to the stripper, gas/liquid contact means within the absorber, a gas outlet from the stripper, a vacuum source operatively connected to the stripper to reduce the pressure within the stripper to below atmospheric pressure, and a water outlet from the stripper.

Preferably, the second line leads to a flash zone in the stripper and the water recycle leads from the flash zone back to the absorber. The apparatus may further include gas/liquid contact means for the liquid in the first line and the gas flowing up through the stripper, and means to effect heat exchange between the second water line and a portion of water from the stripper water outlet.

The invention may be carried into practice in various ways and one embodiment will now be described by way of example with reference to the accompanying drawings in which the single FIGURE is a schematic diagram of a process for the removal of sulphur dioxide from hot inlet gases and the supply of a hot water stream, essentially free of sulphur oxides in accordance with the invention.

The process essentially comprises two vessels 1 and 2, the first being an absorber having three sections 3, 4, 5 and the second being a stripper having two sections 6, 7. Each section includes a suitable packing material, such as rashig rings to encourage intimate contact between gases and liquid streams generally flowing counter-currently. In the absorber 1, a liquid catch tray is located beneath the upper and middle sections, 3 and 4 respectively, arranged to enable gas and liquid phases to disengage and for the liquid to be separately withdrawn.

The absorber 1 operates at about atmospheric pressure, or at a pressure up to about 3 atmospheres.

Gases containing sulphur dioxide and possibly $NO_x$ enter the bottom of the first vessel 1 at a temperature above 100° C., via an inlet stream 8 and are counter-currently contacted with a coolant water stream 10, 12 circulating between the bottom section 5 in the first vessel 1 and a flash pan 9 located in the second vessel 2, which operates under a reduced pressure between 0.075 and 0.375 atmospheres, preferably between 0.1 and 0.3 atmospheres, e.g. 0.2 atmospheres. This cools the gases and heats the circulating water.

Two pumps 11, 30 promote the recirculation. However, the relative elevations of the two vessels 1, 2 may be arranged so that the liquid stream 12 will normally flow from the bottom of the first vessel 1 to the flash pan 9 without assistance from a pump due the the prevailing differential pressure between the two vessels 1, 2.

At the reduced operating pressure of around 0.2 atmospheres in the second vessel 2, the liquid stream 10, leaving pan 9, will have a temperature of around 60° C. The temperature of the liquid stream leaving the bottom section 5 of the first vessel will be above this temperature, normally at about 85° C. such that when it enters the flash pan 9, a portion of the water will flash off as steam together with some dissolved sulphur dioxide. The primary function of the circulating streams 10 and 12, is to remove heat from the inlet gases and release it into the second vessel 2, although as stated, some sulphur dioxide will be absorbed in the stream 12, a portion of which will flash off in the flash pan 9.

Cooled gases from the bottom section 5 now pass into the middle section 4, at about 65° C. and are counter-currently contacted with preferably clean, sulphur dioxide free inlet water in stream 14, entering at ambient temperature. The water absorbs some of the sulphur dioxide and collects in the catch tray between the middle section after its temperature has risen by about 15° C. It then leaves via a stream 13 and passes to the top of the upper section 6 in the second vessel 2, due to the pressure differential between the two vessels 1, 2.

Gases leaving the middle section 4 of the first vessel 1, containing considerably less sulphur oxide and at ambient temperature, enter the upper section 3, where they are contacted counter-currently with a recirculating liquid stream 15, into which is injected an alkali for a final treatment before being discharged to the atmosphere. This is preferably caustic soda or a solution of an alkaline salt, preferably one which does not form any precipitate in the process. The recirculating stream 15 may be chilled (not shown) to minimise the discharge of water vapour. Any overflow from the catch tray is recycled via a stream 17, to pass into stream 10 and hence the bottom section 5.

In the upper section 3, caustic soda in solution will react with sulphur dioxide to form sodium sulphite and sodium bi-sulphite, whilst in the bottom section 5 a new balance will be favoured to produce sodium sulphate by reaction with sulphuric acid. Sufficient alkali will consequently be injected through stream 16 essentially to neutralise the sulphuric acid present in the bottom section 5. Also, sufficient water is introduced into the upper section 3 via the stream 16, or via some other source (not shown) to compensate for water flashed-off in the flash pan 9.

A small bleed-stream 18 may be taken from the recirculating stream 15 and injected into the inlet water stream 14, as a corrosion inhibitor within the process. This may also be responsible for neutralising the hot water stream 19, leaving the bottom of the second vessel 2, which it reaches via the stream 13. Alternatively some other soluble alkali salt or inexpensive corrosion inhibitor may be employed.

A bleed stream 29 is taken from the circulating stream 12 to control the accumulation of salts in this circuit and may be passed into the lower section 7 of the second vessel 2 as shown, passed out of the process, or injected into the inlet water 14 at an appropriate point as it passes through the process. Water with dissolved sulphur dioxide is counter-currently contacted in the upper section 6 of the second vessel 2, with steam from the flash pan 9, stripping out the dissolved sulphur dioxide. A deflector 20 positioned below the upper section 6 prevents the stripped water entering the flash pan 9, whilst the stripped sulphur dioxide together with that sulphur dioxide flashed-off in pan 9, leaves the top of the second vessel 2 in a stream 20 as a water saturated vapour drawn-off by a vacuum pump 21, and is discharged from the process in stream 22.

The concentrated sulphur dioxide stream 22, possibly containing $NO_x$, may be subsequently liquified, converted to sulphuric acid or passed to some other process application.

The liquid leaving the upper section 6 should be close to or preferably at its boiling point, around 60° C., controlled by limiting the amount of inlet water in the stream 14. Most of the sulphur dioxide will have been stripped from the liquid which overflows past the deflector 20 and is counter-currently further stripped in the bottom section 7 against the reboil vapours resulting from a recycle stream 23 at the bottom of the second vessel 2.

The water stream 19 leaving the bottom of section 7 at about 60° C. is essentially free of sulphur dioxide and after passing through a pump 24 is passed out of the process in an outlet stream 25. Alternatively, it is further heated in a heat exchanger 26 to about 80° C. against a slip stream 27 taken from the bottom of the first vessel before being passed out of the process in a stream 28. This stream may be discharged into a district heating system or some other low grade heat distribution network. The quantity of solution circulated through recycle streams 10, 12 will normally be at least twice as much as the inlet water stream 14, and may be as high as 5 times as much dependent on the temperature difference between recycle streams 10, 12 and the inlet gas temperature, stream 8.

The quantity of water in the inlet stream 14 and in the outlet hot water stream 25 or 28 will be dependent on the temperature of the inlet gas stream 8; the higher this temperature, the higher the relative quantity and the greater the quantity in the reboil stream 23.

In the arrangement shown, the first vessel 1, is vertically positioned in order to accommodate counter-current flow and to minimise the land area occupied. However, a disadvantage of gas/liquid counter-current flow is that flooding occurs when up-flowing gas, in effect holds-up the down-flowing liquid causing excessive pressure drops. This is a well known phenomenon and the equipment can be designed to avoid it, but this generally requires large X-sectional areas, thus increasing the cost of the vessel. This can be quite significant in applications where the inlet gas volume is large, as is the case with large power stations.

To reduce costs, the first vessel 1 may be arranged horizontally so that the liquid streams flow downwards whilst the gas streams flow horizontally. By positioning the first vessel 1 horizontally, the X-section area, especially of the first section 5, can be considerably reduced, for example, by about 25%. The second vessel 2, however, is preferably vertical to expolit the full benefits of counter-current flow.

Obviously, numerous modifications and variations of the present invention are possible in the light of the above teachings. It is therefore to be understood that within the scope of the appended claims, the invention may be practiced otherwise than as specifically described herein. For example, the neutralisation by the addition of an alkali to upper section 3 can be omitted with the result that sulphuric acid concentrates in the bottom section 5. This may be increased by vanadium oxides present in the inlet stream 8 which catalyse the oxidation of $SO_2$ to $SO_3$ which in turn dissolves in the water to form sulphuric acid. The sulphuric acid can be removed from the system in a bleed stream.

I claim:

1. The method for stripping sulphur oxides from hot flue gases including the steps of providing an absorption chamber and a vertical stripping chamber, operating the absorption chamber at or above atmospheric pressure, operating the stripping chamber substantially below atmospheric pressure, introducing hot flue gases containing sulphur oxide into one end of the absorption chamber as the sole source of thermal energy for both chambers, introducing cool water adjacent the opposite end of the absorption chamber, passing the gases in counter current flow and heat exchange contact with the cool water to cool the gases and absorb the sulphur oxides, collecting the sulphur oxide containing water intermediate the ends of the absorption chamber to form a first stream, introducing said first stream into the upper portion of the stripper chamber; withdrawing a second stream of heated water having sulphur oxides dissolved therein from the one end of said absorption chamber and releasing the stream into a flash zone within and intermediate the ends of the stripper chamber and by virtue of the pressure differential between the chambers flashing the stream as it enters the stripper chamber to absorb thermal energy from the contents of the stripping chamber, passing the flashed vapors of the second stream in counter current flow and heat exchange contact with the first stream to cause the first stream to release its sulphur oxides; collecting the condensate from the flashing of the second stream, causing the water of the first stream to by-pass the collected condensate and pass to the bottom of the stripper chamber, increasing the pressure of the collected condensate sufficiently to recycle it as a cooling and sulphur oxide absorbing stream into the hot gases in the absorption chamber, withdrawing the separated sulphur oxides from the top of the stripper chamber and the water free of sulphur oxides from the bottom of the stripper chamber.

2. The method recited in claim 1 including the additional steps of passing the hot flue gases through a first absorption zone prior to passing through that section of the absorption chamber wherein the first stream is collected; passing the flue gases through a second absorption zone between where the first stream is collected and the source of water.

3. The method recited in claim 2 wherein the absorption chamber is arranged vertically with the introduction of the flue gas being at the bottom of the chamber.

4. An apparatus for removing sulphur oxides from hot flue gases comprising an absorption vessel and a vertical stripper vessel, means for introducing hot sulphur oxide laden gases into one end of said absorption vessel, said absorption vessel having a liquid collection chamber below the gas introduction means, means for introducing cool water into the other end of said absorption vessel, said absorption vessel having a water and gas contact zone between said gas and water introduction means wherein the sulphur oxides will be absorbed into the water; a liquid collection means between said gas and water means, an absorption section in said absorption vessel between said flue gas introduction means and said liquid collection chamber, a conduit connecting said collection means and the upper end of said stripper vessel, means for removing sulphur oxides from the stripper vessel and creating a subatmospheric pressure condition within said stripper vessel; said stripper vessel having spaced upper and lower stripper sections, a flash chamber between said upper and lower stripper sections and conduit means connecting said liquid collection chamber of said absorption vessel to said flash chamber and discharging into said flash chamber for both cooling the contents of said cooling chamber and separating sulphur oxide gases flashed from the liquid from said collection chamber, a condensate collection means in said flash chamber and a pump connected to said collection means and to said absorption vessel for recycling the condensate collected by said collection means into said absorption vessel between said liquid collection means and said absorption section means and said hot gas introduction means.

5. The apparatus described in claim 4 wherein two absorption sections are provided in said absorption vessel, one above and one below said liquid collection chamber.

6. The apparatus described in claim 5 wherein the absorption vessel is also arranged vertically and the flue gas introduction means is adjacent the bottom thereof.

* * * * *